United States Patent

Guyomar et al.

[11] Patent Number: 5,471,108
[45] Date of Patent: Nov. 28, 1995

[54] REALIZATION PROCESS OF A DISTRIBUTION NETWORK OF ELECTRIC SIGNALS, OBTAINED DISTRIBUTION NETWORK AND PIEZOELECTRIC MOTOR INCLUDING SUCH A NETWORK

[75] Inventors: Daniel Guyomar, Nice; Thierry Mazoyer, Vence; Jean-Denis Sauzade, Grasse; Gil Ching, Cagnes Sur Mer, all of France

[73] Assignee: IMRA Europe SA and Techsonic, Valbonne, France

[21] Appl. No.: 193,658

[22] Filed: Feb. 3, 1994

[30]    Foreign Application Priority Data

Feb. 5, 1993 [FR] France ................... 93 01286

[51] Int. Cl.$^6$ ................................... H01L 41/08
[52] U.S. Cl. ................... 310/323; 310/346; 310/359
[58] Field of Search ........................ 310/323, 328, 310/344, 346, 359

[56]            References Cited

U.S. PATENT DOCUMENTS

| | | | |
|---|---|---|---|
| 4,513,219 | 4/1985 | Katsuma et al. ................ | 310/328 |
| 4,678,956 | 7/1987 | Izukawa ........................... | 310/323 |
| 4,763,148 | 8/1988 | Tsukimoto et al. ............. | 310/323 X |
| 4,771,203 | 9/1988 | Mukohjima et al. ............ | 310/323 |
| 5,023,526 | 6/1991 | Kuwabara et al. .............. | 310/323 X |
| 5,034,646 | 7/1991 | Shirasaki ......................... | 310/323 |
| 5,103,128 | 4/1992 | Adachi ............................. | 310/323 |
| 5,225,734 | 7/1993 | Nakanishi ........................ | 310/323 |
| 5,247,220 | 9/1993 | Miyazawa et al. .............. | 310/323 |

FOREIGN PATENT DOCUMENTS 0365231  4/1990  European Pat. Off. .

*Primary Examiner*—Mark O. Budd
*Attorney, Agent, or Firm*—Foley & Lardner

[57]              ABSTRACT

A distribution network of electric signals in a piezoelectric or ultrasonic waves motor, is produced by depositing electrodes of conductive material on one face of a strip in dielectric material, that on the other face of the strip conductive tracks are deposited according to an interconnection diagram, designed beforehand to supply the piezoelectric elements with proper voltage. Drillings are made through the strip between the conductive tracks and the electrodes, and through plating or deposit of conducting material, these drillings are made conductive.

17 Claims, 2 Drawing Sheets

1

REALIZATION PROCESS OF A DISTRIBUTION NETWORK OF ELECTRIC SIGNALS, OBTAINED DISTRIBUTION NETWORK AND PIEZOELECTRIC MOTOR INCLUDING SUCH A NETWORK

DESCRIPTION

The present invention concerns a realization process of a distribution network of electric signals in a piezoelectric or ultrasonic waves motor, a distribution network obtained by implementation of this process, and a piezoelectric motor including such a network.

Ultrasonic waves or piezoelectric motors require the utilization of electrostrictive or piezoelectric elements electrically supplied, so that they start vibrating with an elliptical motion on all points of the surface of vibrating body or stator.

In a known realization example, in order to generate a progressive flexing wave in a ring-like or disk-like stator, the piezoelectric elements are decomposed into angular sectors representing a half wave length ($\lambda/2$). One part of these angular sectors is supplied so as to generate a flexing wave of sinus type and the other part, a quarter of wave length ($\lambda/4$) out of phase, is supplied with cosinus. The combination of two stationnary waves $\pi/2$ out of phase in space (in $\lambda/4$) and $\pi/2$ in time, allows to generate a progressive wave.

In the given example, one has to note that it is necessary to supply the different elements with −sinus, +sinus, −cosinus, +cosinus.

When piezoelectric elements supplied in a complex manner, are assembled, a wire connection is utilized, the elements being connected with copper strips serving as electrodes and connected wire-to-wire via tin brazes or via weldings made of electrically conductive glues. These connections are generally reliable but inevitably expensive due to the numerous operations and labour required.

Furthermore, all brazing process tends to deteriorate the remanent polarization of the piezoelectric elements due to local overheating. An advantage of this solution is that each piezoelectric element is arranged in an independant manner.

Presently, the most satisfactory technical solution resorts to a process of alternated remanent polarization on the same piezoelectric ceramics. This alternate polarization is an advantageous substitute for the opposed signals of −sinus and −cosinus type.

A known technique represented on FIG. 1, utilizes a monolithic ceramics on which electrodes 3a are etched, allowing alternate remanent polarizations of distinct angular networks.

A first common electrode 3b allows to supply a part of the elements with sinus and a second common electrode 3c allows to supply the other part with cosinus.

Signals are referenced to a common mass on which are connected all the distinct electrodes.

The simplicity of this solution is a great advantage for mass production, the only wiring operation being the connections in sinus and in cosinus of the common electrodes.

However, the implementation of this technique raises some difficulties. In particular, the alternate polarization operation is nearly impossible in case of ceramics with a high electromechanical efficiency.

In addition, in order to increase the power of the motors, it may be useful to use instead of a monolithic ceramics, an assembly of thicker individual sectors of ceramics.

The process and the devices according to the invention allow to remedy to the different disadvantages of former techniques.

The process according to the invention and the devices resulting from its implementation apply particularly to high powered and most compact as possible piezoelectric motors.

These devices may utilize the process according to the invention for the distribution of signals as well as according to particular realization modes for the integration of operating electronics or for the dissipation of heat.

Indeed, the prior state of art doesn't include electronics components in the mechanical box of the motor, due not only to reasons of spatial requirement but also of heat dissipation.

The application for Japanese patent 89-227880 dated Sep. 1st 1989 mentions a traditional device of heat dissipation via a system of blades and heat conducting pipes.

The application for Japanese patent 89-079447 dated Mar. 30th 1989 describes a mechanism allowing to increase the contact force between the stator and the rotor in order to improve the thermal dissipation of the rotor when temperature rises.

In order to get a better understanding, the following description concerns the application of the process according to the invention to progressive wave ring-like piezoelectric motors.

It is clear that the process according to the invention may be extended to all types of piezoelectric motors, with an adaptation within the reach of people in the profession.

The present invention aims at a realization process of a distribution network of electric signals in a piezoelectric or ultrasonic waves motor, characterized by the fact that electrodes made of conductive material, for instance copper 35 µm thick, are deposited on one face of a strip in dielectric material, for instance polyimide or epoxy glass 100 µm thick, that on the other face of the strip conductive tracks are deposited according to an interconnection diagram, previously designed to supply the piezoelectric elements with proper voltage, that drillings going through the strip between the conductive tracks and the electrodes are made, and that these drillings are made conductive by plating or by deposit of conductive material.

According to a preferred implementation of the invention, the diameter of the drillings varies between 0,3 mm and 0,8 min.

The present invention also has for object a distribution network of electrical signals in a piezoelectric or ultrasonic waves motor, obtained by implementing the above described process.

The interconnection circuit thus realized is devised so as to secure the good working of the piezoelectric motor, being for instance connected to supply source at four brazed points for voltages of −sinus, +sinus, −cosinus, +cosinus type.

The circuit thus constitued is then connected to the piezoelectric elements, preferably by glueing by means of, for instance, a thin layer of epoxy resin of some 10 µm.

This technique allows to constitute electrodes of variable geometries and surfaces according to the needs and to utilize piezoelectric elements either monolithic or split, previously provided with electrodes or not.

In particular, this process allows to generate a progressive wave by using a multiphase supply.

As an example, the combination of 3 stationary waves for instance $\pi/3$ out of phase in space and in time allows to generate a progressive wave whose motion is of type:

$$u = 3/2\ A\ \text{Cos}\ (wt+n\theta)$$

The advantage of this generating mode is that power is increased in a 1,5 factor with respect to the two-wave system (the rest remaining the same).

An appropriate glueing requires the use of 6 different connection points. The mass being floating and common.

According to whether the electric network operates with (2 n+1)λ or (3 n+1)λ, the phase shift in space will be respectively of λ/6 or λ/3.

According to particular realization modes:

the interconnection circuit may include different levels of conductive tracks, the interconnection circuit may include different mass levels interposed between the tracks and the electrodes, the interconnection circuit may include a closing coat for the protection of the tracks and a planar conductive coat for the mutual protection of electromagnetic fields, the interconnection circuit may include an input-output connector, the interconnection circuit may include part of or be directly connected to a flexible or rigid multilayer printed board securing the connection and arrangement of electronic components allowing to supply, operate and control the piezoelectric motor, the interconnection circuit may include a system of electrodes allowing a multiphase supply, in particular a three-phase supply, the interconnection circuit may include a part such as a membrane or a seal, one function of which being the realization of a leakproof section constituted at least by one wall of the stator. In order to realize this sectioning, the process according to the invention may be extended to all membrane or seal shaped as a thin, for instance 100 μm thick, conductive or dielectric strip, with or without an electrical function, and linked to the stator or to piezoelectric elements by a welding possibly realized with epoxy resin on a thin layer of, for instance 10 μm.

The said strip is linked, in a leakproof manner, to a fixed part, for instance the box, in order to form a leakproof section in wich a cooling liquid is introduced. This cooling liquid must be chemically inert and compatible with the immersion of electronic components, it may convey the calories either by conduction-convection or by evapo-condensation. In this latest case, the temperature of the phase change must be properly selected. For instance, heat exchanger liquids containing fluorocarbon, of the 3M firm and of FC type may be used.

The present invention also has for object a piezoelectric or ultrasonic waves motor comprising a distribution network of electric signals of above described type, assembled to the piezoelectric elements of the motor by means of a thin layer of glue.

The annexed drawing illustrates a particular realization mode of the invention. In this drawing.

Figure 1:
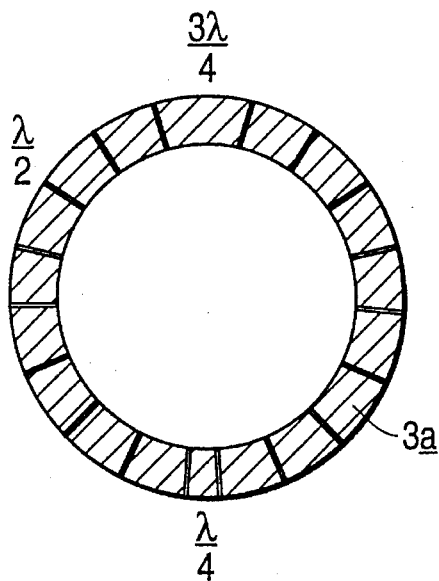
FIGS. 1 and 2 are respectively a top view and a bottom view of a monolithic piezoelectric element provided with electrodes, according to a prior art.
Figure 2:
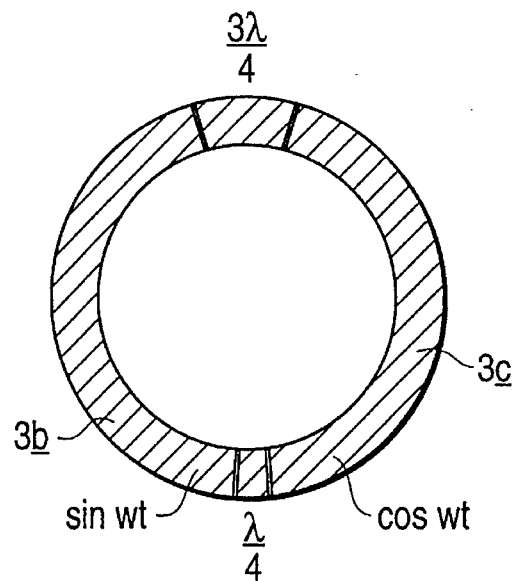
Figure 3:
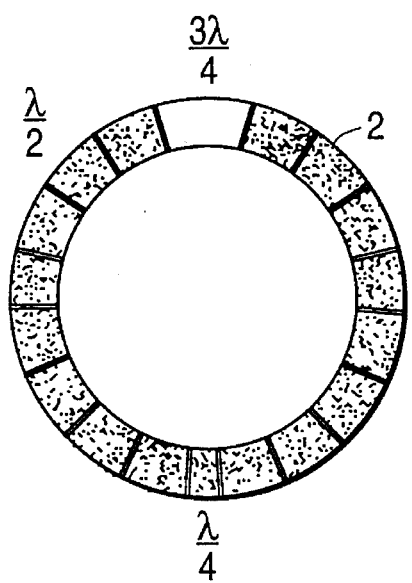
FIG. 3 and 4 show an example of device realized by implementation of the process according to the invention and allowing the distribution of signals on a ring-like stator of a progressive wave piezoelectric motor.
Figure 4:
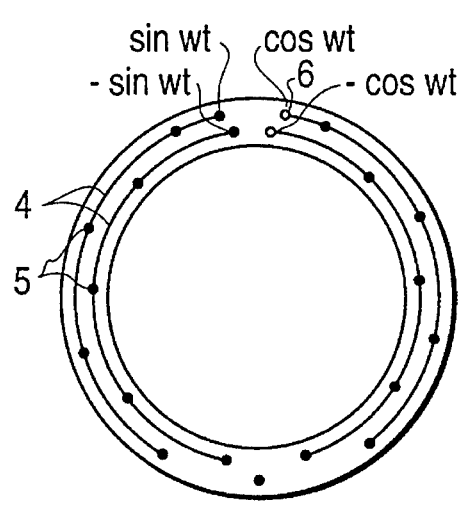
Figure 5:
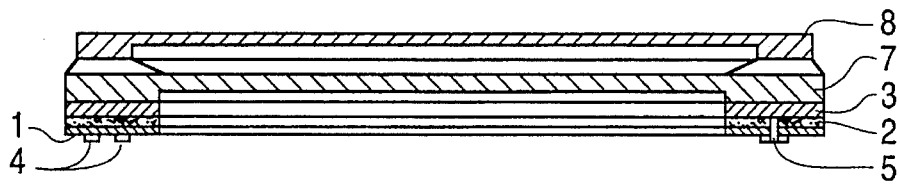
FIG. 5 is a sectional view of the same device cemented on the stator.

Refering to the drawing, the device includes a strip in dielectric material 1 on which conductive electrodes 2 with a shape corresponding to the surfaces of piezoelectric material 3 to be polarized, are etched.

On the other surface of the strip in dielectric material, conductive tracks 4 are etched; they are connected to the electrodes 2 by means of interconnection holes 5 with four inputs that are the brazing pins supplied by alternative voltages respectively of the type −sin (wt), +sin (wt), −cos(wt) and +cos(wt).

These different voltages are distributed on the electrodes 2 which polarize the piezoelectric element 3 through a coat of glue so as to generate a progressive wave within the stator 7. The surface of the stator 7 undergoes an elliptical mouvement which impels by friction a rotor 8 rotating around an axis 9. The rotor 8 itself impels a shaft 8a going outside the motor and depending on the rotor 8.

According to a non illustrated variation, the piezoelectric element 3 may be split and constituted by sectors whose number is a submultiple of the wave length generated in the stator 7. The interconnection circuit allows to supply properly these different sectors and secures their cohesion before being cemented to the stator 7.

According to non illustrated variations and due to the complexity and the characteristics of the piezoelectric motors that are to be supplied, the interconnection circuit may include different levels of conductive tracks and different levels of planar lays allowing on the one hand to avoid harmful polarizations and on the other hand to avoid disturbances of electromagnetic types.

Figure 7:
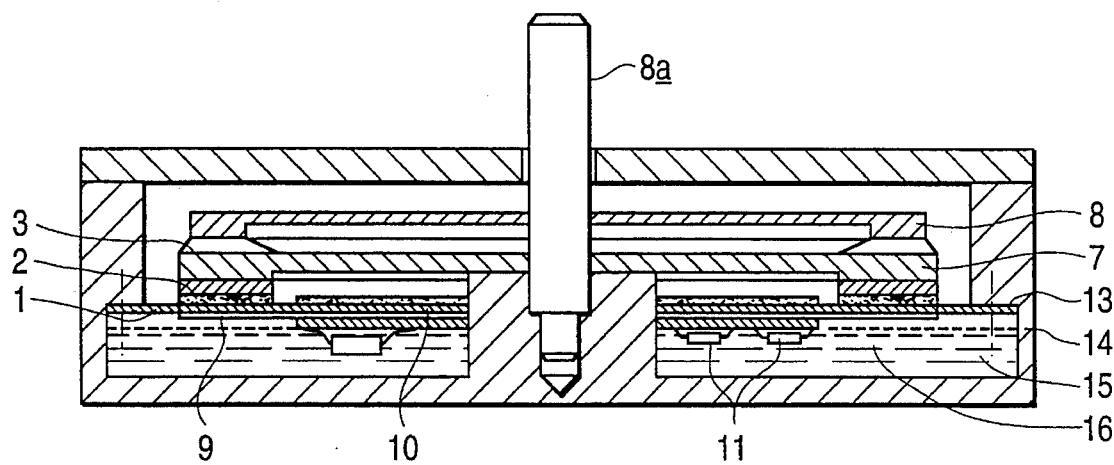
FIG. 7 is a sectional view of a variation of this device including integrated electronics and a section with the cooling liquid of the stator, piezoelectric elements and electronics.

In the realization mode of FIG. 7, the interconnection circuit 9 of a flexible type is connected by manufacturer to a said rigid cicuit 10 which comprises the connection capacity for electronic components 11. These components will be preferably of a surface assembling type, for spatial requirement reasons. The electronics, thus integrated, is supplied by a connector allowing to suppress manual brazing operations.

Figure 6:
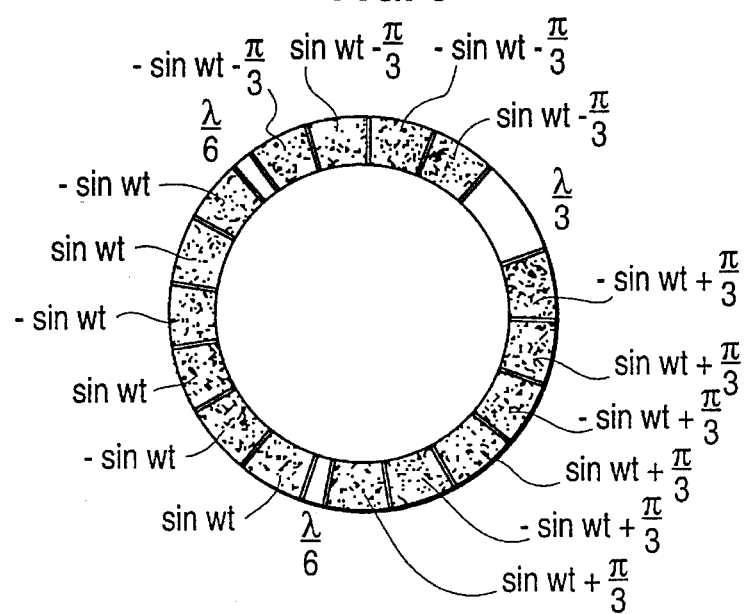
FIG. 6 illustrates an example of an electrode deposition, λ/6 out of phase, allowing to combine three out of phase stationnary waves.

The interconnection circuit 9 includes, in its realization form of FIG. 6 and as an example, a flange 13 serving as a membrane with no disturbing influence on the wave generation in the stator 7. This flange 13 is fixed mechanically to the box 14 so as to constitute a leakproof cavity 15 containing a cooling liquid For example, the cooling liquid may have a temperature of phase change around 50° C. The heating elements are the stator due to friction losses, the piezoelectric elements due to dielectric losses and the electronic components. These elements are immerged in the cooling liquid which, at their contact, evaporates and condensates at the box level, conveying thus a great quantity of heat at a constant temperature.

The process according to the invention and the resulting devices are particularly fitted to piezoelectric motors when its power has to be increased, avoiding alternate remanent polarization on the piezoelectric element, by a splitting of the piezoelectric element in order to increase its thickness without reaching the flexing breaking point allowing a high dissipation rate of calories towards outside. Furthermore, this process is perfectly adapted to mass production.

As a non restrictive example, the device according to the invention will fit in a space requiring 150 mm in diameter by 20 mm in height for motors of about 30 to 50 W.

It is clear that the realization mode that has just been described is not restrictive and that it may undergo any desirable modification without going out of the invention frame.

We claim:

1. A distribution network of electric signals in a piezoelectric or ultrasonic waves motor, characterized by the fact that electrodes of conductive material are deposited on one face of a strip of dielectric material, that on the other face of the strip conductive tracks are deposited according to an interconnection diagram, designed beforehand to supply the piezoelectric elements with proper voltage, that drillings going through the strip between the conductive tracks and the electrodes are made, and that through plating or deposit of conducting material, these drillings are made conductive.

2. The distribution network of claim 1, characterized by the fact that four conductive tracks, each of them respectively supplied with −sine, +sine, −cosine, and +cosine type voltage, are realized.

3. The distribution network of claim 1, characterized by the fact that drillings, the diameter of which varies from about 0.3 mm and 0.8 mm, are made.

4. A piezoelectric or ultrasonic waves motor, characterized by the fact that it includes an electric signals distribution network according to claim 1, assembled by welding to piezoelectric elements of the motor by means of a thin layer of glue.

5. A motor according to claim 4, characterized by the fact that the power supply network is linked to the piezoelectric elements by means of an epoxy resin on a thin layer, preferably of 10 mm.

6. A motor according to claim 4, characterized by the fact that the piezoelectric element is split into several elements.

7. A motor according to claim 4, characterized by the fact that it includes electronic components placed on a part of one face of the strip.

8. A motor according to claim 4, characterized by the fact that it includes a heat exchanging fluid, enclosed in an impervious cavity delimited in particular by a face of the strip opposite the piezoelectric elements, while a part of the stator, the piezoelectric elements and the electronic components are immersed in the heat exchanging fluid.

9. The distribution network of claim 2, characterized by the fact that drillings, the diameter of which varies from about 0.3 mm and 0.8 mm, are made.

10. A distribution network according to claim 3, characterized by the fact that it includes four conductive tracks supplied by voltages respectively of the type −sine, +sine, −cosine, and +cosine.

11. A motor according to claim 5, characterized by the fact that the piezoelectric element is split into several elements.

12. Motor according to claim 5, characterized by the fact that it includes electronic components placed on a part of one face of the strip.

13. A motor according to claim 6, characterized by the fact that it includes electronic components placed on a part of one face of the strip.

14. A motor according to claim 5, characterized by the fact that it includes a heat exchanging fluid, enclosed in an impervious cavity delimited in particular by the inferior face of the strip, while a part of the stator, the piezoelectric elements and the electronic components are immersed in the heat exchanging fluid.

15. A motor according to claim 6, characterized by the fact that it includes a heat exchanging fluid, enclosed in an impervious cavity delimited in particular by the inferior face of the strip, while a part of the stator, the piezoelectric elements and the electronic components are immersed in the heat exchanging fluid.

16. A motor according to claim 7, characterized by the fact that it includes a heat exchanging fluid, enclosed in an impervious cavity delimited in particular by a face of the strip opposite the piezoelectric elements, while a part of the stator, the piezoelectric elements and the electronic components are immersed in the heat exchanging fluid.

17. A piezoelectric or ultrasonic waves motor, characterized by the fact that it includes an electric signal distribution network according to claim 10, assembled by welding to piezoelectric elements of the motor by means of a thin layer of glue.

* * * * *